(12) United States Patent
Doppstadt

(10) Patent No.: US 11,407,009 B2
(45) Date of Patent: Aug. 9, 2022

(54) APPARATUS FOR CLASSIFICATION OF MATERIAL TO BE CLASSIFIED

(71) Applicant: Doppstadt Familienholding GmbH, Velbert (DE)

(72) Inventor: Ferdinand Doppstadt, Velbert (DE)

(73) Assignee: Doppstadt Familienholding GmbH, Velbert (DE)

( * ) Notice: Subject to any disclaimer, the term of this patent is extended or adjusted under 35 U.S.C. 154(b) by 454 days.

(21) Appl. No.: 16/490,816

(22) PCT Filed: Apr. 12, 2018

(86) PCT No.: PCT/EP2018/059349
§ 371 (c)(1),
(2) Date: Sep. 3, 2019

(87) PCT Pub. No.: WO2018/202395
PCT Pub. Date: Nov. 8, 2018

(65) Prior Publication Data
US 2019/0388937 A1    Dec. 26, 2019

(30) Foreign Application Priority Data

May 4, 2017    (DE) ..................... 10 2017 004 272.1

(51) Int. Cl.
*B07B 1/15*    (2006.01)
*F16C 27/06*    (2006.01)
(52) U.S. Cl.
CPC .............. *B07B 1/15* (2013.01); *F16C 27/066* (2013.01); *F16C 2320/00* (2013.01)

(58) Field of Classification Search
CPC .... B07B 1/14; B07B 1/15; B07B 1/16; Y10T 29/49554; F16C 27/066; F16C 2320/00
See application file for complete search history.

(56) References Cited

U.S. PATENT DOCUMENTS 1,699,718  A      1/1929  Robins
2,534,738  A  *  12/1950  Scott ......................... B04B 9/12
                                                                    384/196

(Continued)

FOREIGN PATENT DOCUMENTS

DE      1806555 A1    6/1969
DE      1782501 B1    3/1973

(Continued)

OTHER PUBLICATIONS

Invitation to Pay Additional Fees and, Where Applicable, Protest Fee for International Application No. PCT/EP2018/059349, dated Jul. 20, 2018.

(Continued)

*Primary Examiner* — Joseph C Rodriguez
(74) *Attorney, Agent, or Firm* — Jason H. Vick; Sheridan Ross, PC

(57) ABSTRACT

A device configured to classify material to be classified, preferably into two fractions, preferably of soil, such as sticky, clayey soil, especially intended for use in a quarry, having a machine frame and having at least two spiral shafts rotatably mounted on the machine frame. At least one spiral shaft includes a core tube having at least one outer screw helix and at least one bearing journal. The core tube is mounted elastically relative to the bearing journal by at least one elastic bearing.

19 Claims, 13 Drawing Sheets

(56) References Cited

U.S. PATENT DOCUMENTS

| | | | | |
|---|---|---|---|---|
| 3,047,345 | A | * | 7/1962 | Burton .................... B60K 17/24 384/536 |
| 5,024,335 | A | * | 6/1991 | Lundell .................. B07B 15/00 209/618 |
| 5,816,511 | A | * | 10/1998 | Bernardi .................... B02C 4/38 241/230 |
| 6,237,865 | B1 | * | 5/2001 | Luttermann ........ B02C 13/2804 241/101.72 |
| 8,939,292 | B2 | * | 1/2015 | Doppstadt ................ B07B 1/14 209/254 |
| 9,849,484 | B2 | * | 12/2017 | Guenther ............... B07B 1/145 |
| 2002/0037124 | A1 | * | 3/2002 | Bade ..................... F16C 27/066 384/536 |
| 2018/0334030 | A1 | * | 11/2018 | Seipel .................... F16F 1/3842 |
| 2018/0363669 | A1 | * | 12/2018 | Sullivan .................. F04D 25/06 |
| 2019/0247999 | A1 | * | 8/2019 | Kataoka ................ F16C 27/066 |
| 2019/0264736 | A1 | * | 8/2019 | Durre .................... F16C 27/066 |
| 2020/0096041 | A1 | * | 3/2020 | Wojtyczka .............. F01D 25/04 |
| 2021/0131495 | A1 | * | 5/2021 | Parris .................... F16C 33/583 |

FOREIGN PATENT DOCUMENTS

| | | |
|---|---|---|
| DE | 102013011102 A1 | 1/2015 |
| DE | 102014110816 A1 | 2/2016 |
| EP | 0173638 A2 | 3/1986 |
| EP | 1193410 A1 | 4/2002 |

OTHER PUBLICATIONS

International Search Report for International Application No. PCT/EP2018/059349, dated Oct. 5, 2018.

Written Opinion for International Application No. PCT/EP2018/059349, dated Oct. 5, 2018.

International Preliminary Report on Patentability for International Application No. PCT/EP2018/059349, dated Nov. 14, 2019.

* cited by examiner

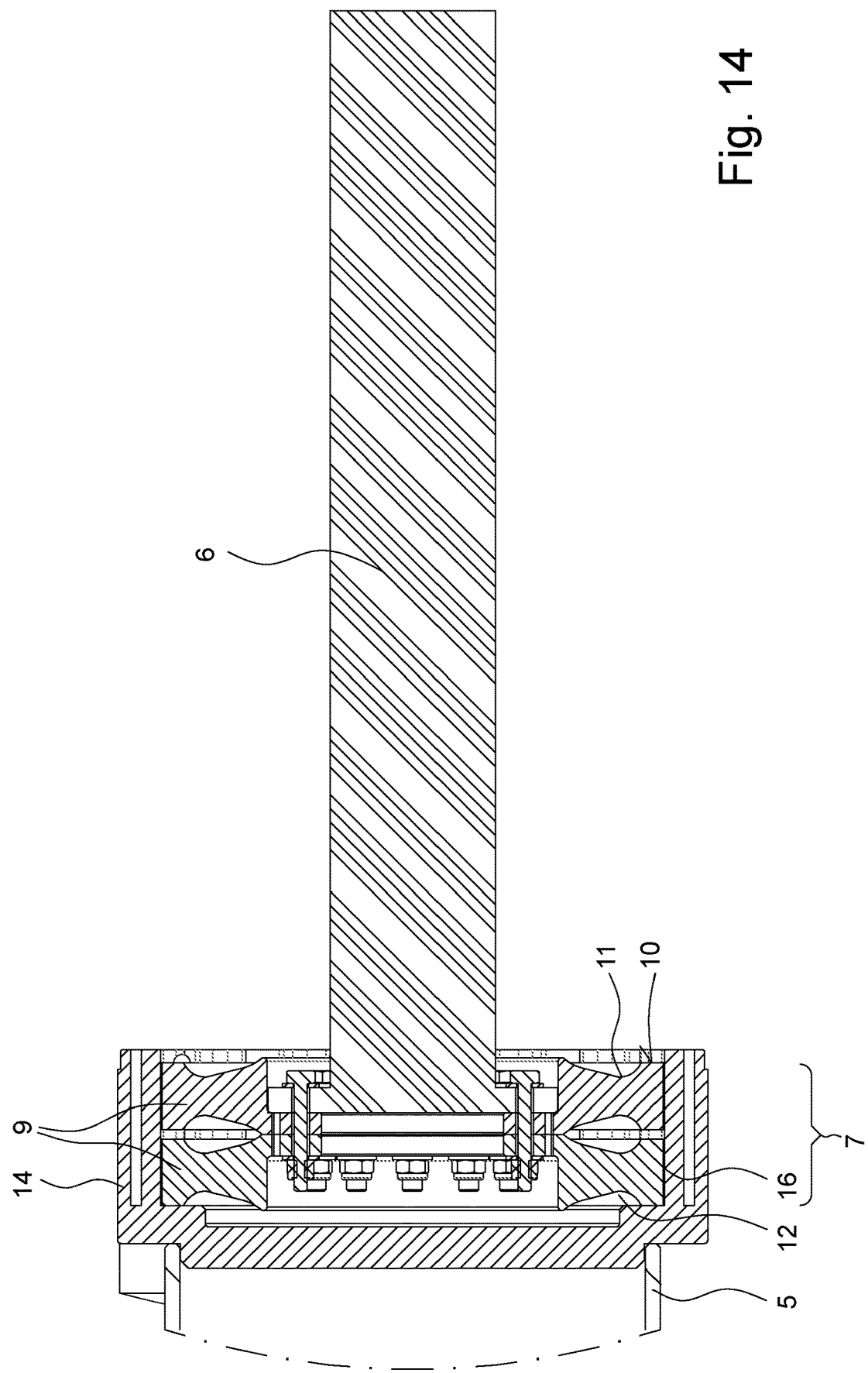

APPARATUS FOR CLASSIFICATION OF MATERIAL TO BE CLASSIFIED

CROSS REFERENCE TO RELATED APPLICATIONS

This application is a national stage application Under 35 U.S.C. 371 of PCT Application No. PCT/EP2018/059349 having an international filing date of 12 Apr. 2018 which designated the United States, which PCT application claimed the benefit of German Application No. 10 2017 004 272.1 filed 4 May 2017, each of which are incorporated herein by reference in their entirety.

SUMMARY

The invention relates to an apparatus for classifying material to be classified, preferably into two fractions, preferably of soil, such as sticky, clayey soil, especially intended for use in a quarry, having a machine frame and having at least two spiral shafts rotatably mounted on the machine frame, wherein at least one spiral shaft comprises a core tube having at least one outer screw helix and at least one bearing journal.

Apparatuses for classifying and/or for sorting of the aforementioned kind having spiral shafts are already known in practice. Basically, a distinction is drawn between classifying and sorting. Classifying represents a mechanical separation method for mixtures of solids. Classifying makes use of geometrical features, such as the size and/or the shape of the individual particles, for the separation process. Preferably, an apparatus for classifying separates the feedstock (material to be classified) into different particle sizes, especially into coarse and fine material. The coarse material includes all particles larger than a given separation grain size, and analogously the fine material includes those particles which are smaller than the separation grain size. On the other hand, sorting is a mechanical separation process in which a mixture of solids with different physical features is divided up into fractions with the same physical features. Sorting makes use of properties such as density, color, shape and/or wettability.

Classifying apparatuses are used in various fields of application, such as secondary fuel preparation and/or food processing, but also for example in quarries, wherein the soil can be separated preferably from larger rocks.

Furthermore, it is also known in practice that it is advantageous for the classifying apparatus to have at least substantially parallel arranged, mutually engaging spiral shafts, also known as screw conveyors. In one known apparatus, the spiral shafts are supported at one end and/or mounted at one end. Spiral shafts supported at one end form a cantilever. A cantilever is a horizontal beam clamped at one end, subjected to a loading, wherein it has only one support.

In a classifying apparatus with spiral shafts clamped at one end, it is even possible to perform a separation into three fractions. The feedstock in this case is fed at a given angle onto multiple spiral shafts, especially shafts turning in the same direction of rotation. Thanks to the runway effect, the feedstock is conveyed at the same time both in the longitudinal direction and also sideways through the spiral shafts. All pieces which are smaller than the design-dictated gaps defining the separation size will drop through the spiral shafts. Long, thin pieces will be delivered in the direction of rotation and thick cubic pieces will be discharged beyond the freely extending shaft ends. The so-called free grain dropping through the gaps, like the two coarse materials, can be transported away by suitable conveyor belts underneath the spiral shafts.

The drawback to the classifying apparatus known in practice with spiral shafts mounted at one end is that heavy damage may occur under the large loadings of classifying, such as occur at quarries for example. Thus, damage may occur when loading the material, due to the impulse created when the material to be classified impacts the spiral shafts and/or due to the spreading forces between the spiral shafts after being impacted by the material to be classified.

Moreover, it is known from practice that a multiple of spiral shafts, which are supported on a machine frame and rotatably mounted, are arranged in a trough shape, wherein two spiral shafts located in the middle and situated at the low point of the trough turn opposite each other, whereas the spiral shafts arranged at the sides turn in the same direction as the middle spiral shaft facing toward them. Thanks to the trough-like arrangement of the spiral shafts, intensive material movements occur, which are characterized by repeated rising of the feedstock and/or material to be classified and the falling back down of the material to be classified along the flanks of the classifying apparatus.

The drawback to this design known in practice is once again that damage to the classifying apparatus can occur, especially in the area of the spiral shafts, upon occurrence of heavy stresses during operation, such as occur especially at quarries.

The problem which the present invention proposes to solve is to provide an apparatus for classifying which avoids the shortcomings of the apparatuses known in practice or at least substantially reduces them. In particular, the problem which the present invention proposes to solve is to provide an apparatus for classifying which can withstand the larger and/or high loadings which occur in particular when using the apparatus in a quarry for the classifying of soil.

The aforementioned problem is solved in a classifying apparatus of the aforementioned kind at least substantially according to the invention in that the core tube is mounted elastically relative to the bearing journal by means of at least one elastic bearing means.

In connection with the creation of the invention, it was discovered that the heavy stresses and loadings occurring during operation of the apparatus, such as occur at a quarry, can be withstood if there is a possibility of sideways movement of the spiral shaft, including with an elastic mounting of the spiral shaft at just one end. The invention makes this possible by the realization of the elastic mounting of the core tube by means of the elastic bearing means. In particular, it has been established in tests carried out that the elastic mounting of the spiral shaft as compared to the classifying and/or sorting apparatus known in practice can withstand up to 80% higher loadings. Thanks to the elastic bearing means, it becomes possible for the spiral shafts, especially in the form of drums, to yield by a few millimeters to a centimeter before side forces of reaction, in any direction transversely to the axis of rotation as needed, and thus especially in the radial direction. Even critical feedstock, especially rocks whose diameter roughly corresponds to the clear space between two spiral shafts, especially between two adjacent outer screw helices, can be classified by the apparatus according to the invention.

But the solution according to the invention not only affords the benefit, on the one hand, that the spiral shafts can spread apart as needed during the classifying operation on account of the elastic bearing means and thus avoid damage to the spiral shafts. The elastic mounting of the core tube also means, on the other hand, that the impulse resulting from heavy feedstock landing on the spiral shafts is dampened. Because of these properties, the apparatus according to the invention is characterized in particular in being able to be used in a quarry, wherein in particular it can classify both sticky and/or solid materials and also larger rocks.

Preferably, the loading and/or charging of the material to be classified is done by means of an excavator, wherein the feedstock is being placed from above onto the classifying apparatus. Advantageously, a vibrational screen and/or a grating is provided above the feed, so that a rough pre-classification may already occur.

The classifying operation of the apparatus according to the invention is not affected in any way by the elastic mounting of the core tube. After a possible elastic yielding movement of the spiral shaft, the spiral shaft returns to its starting state, especially because of the elastic properties of the elastic bearing means. Ultimately, the elastic mounting leads to the classifying apparatus according to the invention having a longer operating time and/or service life, thanks to the greater loadings which it can withstand, as compared to the apparatuses known in practice, so that high repair costs and/or maintenance costs can be avoided.

In the tests performed, moreover, it was established that the classifying apparatus according to the invention has twice the operating time and/or service life of the classifying apparatuses known in practice. In particular, the use of the classifying apparatus according to the invention results in a lowering of ongoing operating costs.

The elastic bearing means preferably has a progressive spring characteristic. A progressive characteristic and/or a progressive force/distance function means that a spring, by which is meant functionally the elastic bearing means, becomes harder with increasing loading, in order to prevent the spring from breaking through under strong loading or to provide a rapid decay of oscillations. The hardness indicates the mechanical resistance which a material presents to the mechanical penetration of another body. Thanks to the progressive spring characteristic, the classifying apparatus according to the invention can withstand extraordinary spreading forces by means of the elastic bearing means.

In one preferred embodiment of the classifying apparatus according to the invention, the spiral shaft is rotatably mounted at both sides by a respective bearing journal. The bearing journal is preferably arranged at the end of the spiral shaft. According to the invention, it may be provided that at least one end is elastically mounted by means of at least one elastic bearing means relative to the bearing journal. Of course, it is understood that, according to the invention, it may also be provided that only one end of the core tube is elastically mounted by means of at least one elastic bearing means relative to the bearing journal. Preferably, however, both ends of the spiral shaft are rotatably and elastically mounted by respective bearing journals. The double-ended elastic mounting of the spiral shaft makes it possible for the spiral shafts to not strike each other during an elastic yielding, especially one caused by heavy loadings, and/or to avoid a damaging of the spiral shafts.

Furthermore, the elastic bearing means according to the invention is preferably characterized in that it is designed such that it makes possible an elastic yielding movement of the core tube, especially when mounted at both ends, transversely to the axis of rotation, especially in the radial direction, of the spiral shaft by up to 3 cm. Precisely because of this embodiment, it is possible to use the classifying apparatus according to the invention at a quarry, since it has been determined that yielding movements of up to 3 cm are needed in order to satisfy the conditions during a quarry operation. For example, if a rock having roughly the diameter of the clear space between two adjacent spiral shafts lands on the spiral shafts, the spiral shafts can give way before this rock on account of their elastic mounting, and the rock will be drawn through the spiral shafts and/or the gap between the spiral shafts.

Alternatively or additionally, in the case of an elastic mounting of the core tube at one end and/or a mounting of the spiral shafts at one end, it may be provided that the elastic bearing means makes possible an elastic yielding movement of the core tube transversely to the axis of rotation, especially in the radial direction, of the spiral shaft by up to 3 cm for every 1 m of length of the core tube. Accordingly, the yielding movement of the core tube can amount to up to 3 cm from the clamping point to the first meter of length, and a yielding movement of up to 6 cm can be made possible at a distance of more than 1 m up to 2 m, and a yielding movement of up to 12 cm can be made possible at a length of 3 m to 4 m. Finally, the yielding movement may be possible in particular between 0.3 and 2 cm per 1 m length of the core tube.

Moreover, in another preferred embodiment of the idea of the invention, it is provided that the elastic bearing means comprises at least one bearing plate having an elastic material, and that the bearing plate is elastically operative between the core tube and the bearing journal of the spiral shaft. In particular, an indirect elastic interaction occurs between the core tube and the bearing journal. The bearing plate realizes an elastomer bearing, wherein it is ultimately understood that the bearing means and/or the elastomer bearing need not consist solely of an elastic material. Thus, it is conceivable to provide a firmer and/or nonelastic or less elastic material on the side surfaces of the bearing means. Thanks to its elastic properties, the bearing plate makes possible a yielding movement of the core tube and/or the spiral shaft in the radial direction. Advantageously, the bearing plate is subject to a progressive spring characteristic. In particular, the transverse stiffness of the bearing means increases under increased loading.

Furthermore, the tests performed have shown that it is especially advantageous when the bearing plate is configured at least substantially as a ring and/or a hollow cylinder. This configuration of the bearing plate is optimally suited to the core tube, especially the drum-like and/or hollow cylindrical tube, in particular wherein there is always present an at least indirect contact between the bearing plate and the core tube. The inner cavity of the bearing plate preferably serves for the direct or indirect receiving and/or mounting of the bearing journal. The optimal stiffness and/or elasticity of the bearing plate results from a suitable, especially a slight, width in the case of an at least substantially ring-shaped configuration of the bearing plate, wherein the wall thickness of the bearing plate can be individually adapted to the area of application of the classifying apparatus.

Preferably, the bearing plate comprises a material reduction, preferably in the form of a recess, particularly an at least substantially circumferential material reduction, on at least one side surface in the area of the elastic material, especially not on the shell surface. In particular, the cross-section surface of the bearing plate is formed in mirror symmetry in the area of the recess, wherein the mirror axis is being situated in particular transversely to the axis of rotation of the spiral shaft. The material recess and/or the material reduction improves a radial yielding movement of the core tube by means of the bearing means and/or the bearing plate. The material reduction provides better spring characteristic values of the bearing plate under a loading. The indentation behavior of the bearing plate is optimized by the material reduction. The material reduction can be done for example in the form of a beam or a web, although it will be understood that different cross-section shapes of the recess may be provided.

In another preferred embodiment, the bearing journal is connected firmly to a bearing plate, especially by force locking, preferably by means of a screw connection. Alternatively, the bearing plate can be rotatably mounted relative to the bearing journal, especially by means of a roller bearing, in particular wherein the roller bearing is provided at the output side. Preferably, a firm connection is provided between the bearing journal and the bearing plate at the drive side, wherein it is understood that the bearing journal co-rotates together with the bearing plate and the overall spiral shaft, especially at the drive side. Advantageously, a stationary bearing journal is provided at the output side, wherein the bearing plate and the spiral shaft are furthermore rotatably mounted.

By a roller bearing here a bearing is meant in which bodies rolling between a so-called inner race and an outer race reduce the frictional resistance. Roller bearings can absorb radial and/or axial forces in particular and at the same time enable the rotation of the shaft or the components so mounted on an axle. In particular, the roller bearing makes possible the rotatable mounting of the spiral shaft.

Finally, it is understood that the bearing plate can be firmly connected in rotatable manner to the bearing journal at the output end as well. Preferably, then, an elastic mounting of the rotatable bearing journal and/or the core tube is also provided at the output end. At the drive end, the spiral shaft may co-rotate at the output end in particular by the rotatable bearing journal, which is firmly connected in particular to the bearing plate. Preferably, at least one motor is arranged at the drive end on at least one bearing journal, in particular wherein the spiral shafts are joined together and preferably driven in common by at least one motor. Preferably, a motor and/or a drive is used at the drive end for the rotation of at least one spiral shaft. It is also conceivable to use multiple motors and/or drives for driving the spiral shafts, in particular wherein the angles of rotation of the motors are synchronized with each other.

Furthermore, in another advantageous embodiment it is provided that the bearing plate is arranged in a bearing housing of the spiral shaft. Preferably, then, the bearing housing is firmly connected to the core tube, especially by force locking, preferably by welding. Advantageously, it is provided at the output end, especially in combination with the roller bearing, that the bearing housing is arranged entirely inside the core tube.

In another embodiment, it may also be provided that the bearing housing, especially at the drive end, is arranged only partly in the interior of the core tube, in particular wherein a portion of the bearing housing protrudes from the interior of the core tube.

Advantageously, the bearing plate is joined by positive locking to the bearing housing. In particular, the positive-locking connection of the bearing plate to the bearing housing enables the elastic mounting by means of the elastic bearing means of the core tube, since the bearing plate can follow the rotational movement together with the core tube thanks to the positive-locking connection. Furthermore, because of the positive-locking connection the bearing plate can be installed more easily in the bearing housing and/or be loosened and/or removed from the bearing housing. It is understood that the bearing plate is elastically operative in particular directly between the bearing housing and the bearing journal, in particular wherein the indirect elastic interaction between the core tube and the bearing journal is provided by the bearing plate.

In one advantageous embodiment of the apparatus according to the invention it is provided that, for the positive-locking connection of the bearing plate to the bearing housing, the bearing housing has internal teeth on the inside. Furthermore, it is preferably provided that a toothed coupling is present between the bearing housing and the bearing means. By a toothed coupling is meant here a largely rotationally rigid and in particular positive-locking coupling which transfers the torque across intermeshing external and internal teeth. Preferably, the internal teeth are generally straight, in particular wherein the external teeth is shaped almost exclusively convex. This enables in particular a compensation for angular offset.

In another preferred embodiment, at least one bearing plate has external teeth corresponding to the internal teeth of the bearing housing, in particular wherein the internal teeth of the bearing housing engages with the external teeth of the bearing plate, preferably to produce a toothed coupling. In particular, this performs both the task of torque transfer and revolving support for the drive-side spiral shaft.

According to a further embodiment of the idea of the invention, it is provided that the bearing plate is configured rotationally symmetrically, at least in the area of the recess of the bearing plate and/or as far as the external teeth of the bearing plate, especially excluding the external teeth, preferably with respect to an axis of rotation of the spiral shaft. A rotationally symmetrical bearing plate is especially suitable to the rotational movement of the spiral shaft, especially since the yielding movement of the core tube is executed when the entire spiral shaft arrangement is turning. In order to ensure that the rotary yielding movement is always the same and ensure the same characteristic values of the elastomer bearing in every operational situation, the rotationally symmetrical design is especially advantageous at least in the region of the recess of the bearing plate.

Another advantageous aspect of the present invention consists preferably in that the elastic bearing means comprises at least two bearing plates. It was established in the tests that two bearing plates in particular create the best possible and/or an optimized spring action of the elastomer bearing. The experiments conducted have revealed that the realization of two weaker bearing plates produce better results than a single stronger bearing plate. Preferably, the roller bearing is provided between the bearing plates, in particular wherein the bearing plates are firmly joined to the roller bearing. In particular, the elastic connection between the roller bearing unit and the spiral shaft also protects the roller bearing against angular offset of the spiral shafts in the machine. In particular, this angular offset may be produced by teeth of the machine frame and/or by operationally caused overloading.

Furthermore, it is understood that the elastic bearing means may have different configurations, in particular wherein two bearing plates are preferably spaced further apart at the output-end bearing means than at the drive-end bearing means. A greater spacing of the bearing plates at the output-end bearing means results in particular from providing a roller bearing between the bearing plates at the output end for the rotatable mounting of the spiral shaft, especially with a stationary bearing journal. The aforementioned configurations also illustrate that different bearing means may be present in a double-ended mounting of the spiral shaft, in particular wherein the elastic bearing means may also be different in the case of a double-ended elastic mounting.

Preferably, the material of the bearing plate is designed such that the bearing means as a deformation bearing enables the movements and/or the displacement of the spiral shaft not by a mechanical design, but instead by a deformation of the bearing plate. Preferably, the bearing means is not reinforced, at least in the area assuring elasticity, although wherein it is basically understood that the bearing plate can also be reinforced. By reinforcement is meant the strengthening of the bearing plate by a further object or means, so that it can withstand in particular a greater compressive and tensile strength. A reinforcement is possible for example by means of a high-strength textile fabric.

Advantageously, the bearing plate comprises at least one material of a form-stable and elastically deformable plastic, especially an elastomer, preferably a rubber elastomer, more preferably an acrylonitrile-butadiene rubber (NBR) and/or chloroprene rubber (CR) and/or ethylene-polypropylene-diene rubber (EPDM), and/or natural rubber (NR). Especially suitable as the material for the bearing plate is a rubber-based material in particular, since this becomes elastically deformed, especially under high compressive loadings, but then—when the loading ceases—it returns to its original, undeformed shape. An elastomer bearing is preferably almost incompressible in shape, in particular wherein it remains at constant volume under a compressive loading and is preferably resilient with a simultaneous stretching of the side surfaces. Various characteristic dimensioning values can be used to define the material of the bearing plate. For example, the permissible compressive stress shows in particular the maximum pressure that the bearing plate can withstand.

In a further preferred embodiment, it is provided that the material of the bearing plate has a permissible compressive stress of greater than $0.01$ $N/mm^2$, preferably greater than 1 $N/mm^2$, more preferably between 1 and 50 $N/mm^2$, more preferably between 1 and 20 $N/mm^2$ and especially at least substantially 15 $N/mm^2$. If the material of the bearing plate preferably withstands a compressive stress of 15 $N/mm^2$, this provides one possible extreme compressive loading. The compressive loading also depends in particular on the bearing width in relation to the bearing thickness and the displacement.

Furthermore, it has been shown that the aforementioned design of the elastic bearing means, especially at the output end, affords the possibility of a relubrication. Accordingly, in a further preferred embodiment it is provided that a lubricating device is provided especially at the output end in the area of the elastic bearing means, especially for lubricating grease, and at least one lubricating duct is provided in the bearing journal having at least one lubricating nipple on the external end face of the bearing journal. Preferably, in this configuration the bearing journal is stationary, so that the lubricating device also does not rotate and/or co-rotate with the spiral shaft. The lubricating device can in particular make possible a relubrication of the roller bearing, wherein of course it is also basically possible to design the roller bearing as a permanently lubricated version. The lubricating device affords the possibility of a relubrication, especially while maintaining rather long lubrication intervals, preferably weekly or monthly. Preferably, the bearing means at the output end is almost air-tight, so that only individual droplets of lubricating grease can be introduced by the lubricating device. The relubrication can be performed relatively easily especially at the drive end, since this region is preferably easily accessible, especially on account of the drive unit.

Moreover, in another embodiment of the lubricating device it is provided that the lubricating nipple is associated with a protective cap and/or protective screw to cover it. This cover protects the lubricating nipple in particular against damage and/or fouling, so that a longer operating time of the overall lubricating device results in particular by protecting the lubricating nipple.

Furthermore, the invention relates to an apparatus for classifying of material to be classified, preferably of soil, especially sticky, clayey soil, especially intended for use in a quarry, having a machine frame and having at least two spiral shafts rotatably mounted on the machine frame. It is basically understood that the apparatus for the classifying of material to be classified can be embodied in an aforementioned configuration. According to the invention, it is provided that at least one elastic bearing means is provided especially at the output end, having at least one bearing support, in order to make possible an elastic yielding movement of the spiral shaft.

The sideways yielding movement of the spiral shaft made possible by the bearing support results in the entire classifying apparatus being able to withstand greater stresses, since especially because of the elastic mounting it is possible to compensate for larger spreading forces and/or compressive loadings. In particular because of the swivel movement and/or sideways yielding movement there results a slightly opening, wedge-shaped gap between two adjacent spiral shafts, ensuring in particular the discharge of rocks of marginal size, especially those with a diameter close to the clear space between two adjacent spiral shafts.

This results not only in a higher loading capacity and/or production duration for the overall classifying apparatus, but also a reduction in operating costs when using the apparatus, since because of the elastic mounting by means of the bearing support, especially at the output end, there are fewer repairs needed, since the spiral shafts can withstand greater loadings. Preferably, the elastic bearing means serves as a spring means, in particular wherein the spring means is provided between a fixed machine frame of the apparatus according to the invention and a fixed bearing bush for the bearing journal of a spiral shaft. The spring means guarantees that an elastic deformation of the bearing means is possible, wherein the bearing means returns to its original form after the stress.

It is understood, of course, that the spiral shaft, especially analogously to the previously described embodiments, comprises at least one core tube having an outer screw helix and at least one bearing journal.

Preferably, the bearing support is designed such that the spiral shaft can perform a yielding movement, especially a swivel movement, transversely to its axis of rotation, preferably in the radial direction, by up to 3 cm. Preferably, this swivel movement guarantees the ability to discharge rocks of marginal size, preferably wherein no damage to the spiral shafts results. This configuration also not only avoids problems which result due to the spreading apart of the spiral shafts during the classifying operation, but also enables a damping of resulting impulses when material to be classified is thrown onto the spiral shafts in this embodiment.

Furthermore, in one advantageous embodiment of the idea of the invention it is provided that the bearing support comprises a bearing bush and a leaf spring as a spring means connected to the bearing bush. The spring means makes possible an elastic, resilient and/or yielding behavior transversely to the axis of rotation at the output end. In particular, a yielding movement is made possible by the resilience of the support bearing. Basically, however, it is also possible to provide for the resilience of the support bearing by a joint. In another preferred embodiment it is provided that the bearing support is elastically mounted with a machine element preferably having an elastic material. In this embodiment, the feet of the bearing support and/or the lower end of the bearing support are preferably elastically mounted, in particular wherein the bearing support is rigid in configuration. The machine element preferably comprises an elastomer and/or a material of a form-stable and elastically deformable plastic, preferably a rubber elastomer, more preferably an acrylonitrile-butadiene rubber (NBR) and/or chloroprene rubber (CR) and/or ethylene-polypropylene-diene rubber (EPDM), and/or natural rubber (NR). Advantageously, the machine element is configured as an elastomer bearing block. The machine element makes possible the elastic mounting of the spiral shaft, especially at the output end.

Another aspect of the present invention is that preferably the material to be classified after being placed on the spiral shafts has a dwell time of over 1 s, preferably over 3 s, more preferably between 4 and 20 s and especially at least substantially between 5 and 15 s. This dwell time of the material to be classified can ensure that the material to be classified is reliably divided up into two fractions, in particular wherein the best possible ratio between a clean separation and the shortest possible classifying time is given.

In another advantageous embodiment of the apparatus according to the invention, a plurality of spiral shafts is provided, wherein the spiral shafts preferably mesh with each other. Each spiral shaft preferably rotates about its longitudinal axis and/or axis of turning, especially its axis of rotation. Preferably, at least two adjacent spiral shafts have the same direction of rotation. Advantageously, the axes of rotation of at least three spiral shafts are not situated in a common plane. It is understood, of course, that the spiral shafts may be braced at least at one end on the machine frame.

Moreover, the spiral shafts preferably form a classifying surface which is curved, especially at least in one partial region. Alternatively or additionally, it is also advantageously possible for the classifying surface to be configured flat in another partial region. In particular, it can be provided that the classifying surface formed by the rotation elements and/or spiral shafts is configured flat in a region on which the unclassified material to be classified is flat. In this way, an especially good classification result is achieved, because the portion of the material to be classified which actually needs to fall through between the rotation elements—the spiral shafts—remains for a longer time in the latter's region of influence and therefore the likelihood of the desired falling-through is increased. Ultimately, this will significantly improve the classification result. Also, the clinging together of different portions of the material to be classified, especially in the case of clayey sticky materials, can be loosened. Advantageously, it may be provided that the classifying surface formed by the spiral shafts forms a trough and/or is part of a trough.

In one special embodiment, it is provided that the outer screw helix of one spiral shaft reaches as far as the outer core tube of an adjacent spiral shaft. In particular, the spacing between adjacent core tubes defines the separation size and/or the separating particle diameter of the separation grain.

In another advantageous embodiment of the apparatus according to the invention it is provided that the spiral shafts comprise different core tubes, in particular wherein the core tubes situated in the middle of the classifying surface have larger diameter and/or a greater wall thickness. This different configuration of the core tubes especially increases the robustness of the apparatus according to the invention, so that a longer operating time results in particular. In particular, in this advantageous embodiment the middle of the classifying surface is the lowest point of the trough-shaped arrangement of the spiral shafts. By increasing the wall thickness and the diameter of the core tubes in this region, a stronger version is achieved in particular, which preferably withstands greater compressive loadings and greater wear. Large compressive stresses and greater erosion occur precisely in the middle of the trough, since the material to be classified preferably dwells longer in this region.

Furthermore, in one special embodiment it is provided that two spiral shafts have a different direction of turning. Preferably the spiral shafts in a first partial region of the classifying surface have the same first direction of turning and the spiral shafts in a second partial region of the classifying surface, different from the first partial region, have a direction of turning opposite the first direction of turning. It is basically understood here that this embodiment of the different directions of turning may also be implemented between adjacent spiral shafts. Thanks to this embodiment of the apparatus according to the invention, it may be provided advantageously that a force is exerted on the material to be classified, especially a force directed toward the center of the classifying surface and/or the lowest point of a trough, so that this material preferably goes to the central region of the classifying surface. This desirable transporting action results solely from this special configuration of the different directions of rotation, in particular wherein this desirable transporting action does not occur when adjacent rotation elements/spiral shafts have an opposite direction of rotation in alternating manner.

In another advantageous embodiment of the apparatus according to the invention, it is provided that a classifying surface center and/or the lowest point of the trough is arranged between the first partial region and the second partial region of the classifying surface. The trough is formed coaxially to the spiral shafts, preferably in mirror symmetry. Thus, the first and second partial regions are mirror-symmetrical with respect to the middle of the trough.

Of course, the conveying direction of the material to be classified on the spiral shafts can basically be oriented transversely and/or parallel to the axial direction and/or the axis of rotation of the spiral shafts. In particular, the conveying direction of the material to be classified defines the ejecting direction and/or the ejecting zone of the first fraction of the classified material. The second fraction is ejected in particular beneath the apparatus according to the invention and/or beneath the spiral shafts.

Preferably, the spiral shafts are operated with the same velocity and especially with different directions of rotation and/or turning. The spiral shafts in the first partial region preferably turn in one direction and the spiral shafts in the other partial region preferably turn in the other direction, in each case such that the feedstock and/or the material to be classified is moved into the middle of the trough.

BRIEF DESCRIPTION OF THE DRAWINGS

Further features, benefits and application possibilities of the present invention will emerge from the following description of exemplary embodiments on the basis of the drawing, and from the drawing itself. All described and/or depicted features in themselves or in any given combination form the subject matter of the invention, regardless of whether they are summarized in the claims or references to them.

FIG. 14 shows a cross sectional view of detail E of FIG. 12 of a spiral shaft according to the invention.

DETAILED DESCRIPTION

Figure 1:
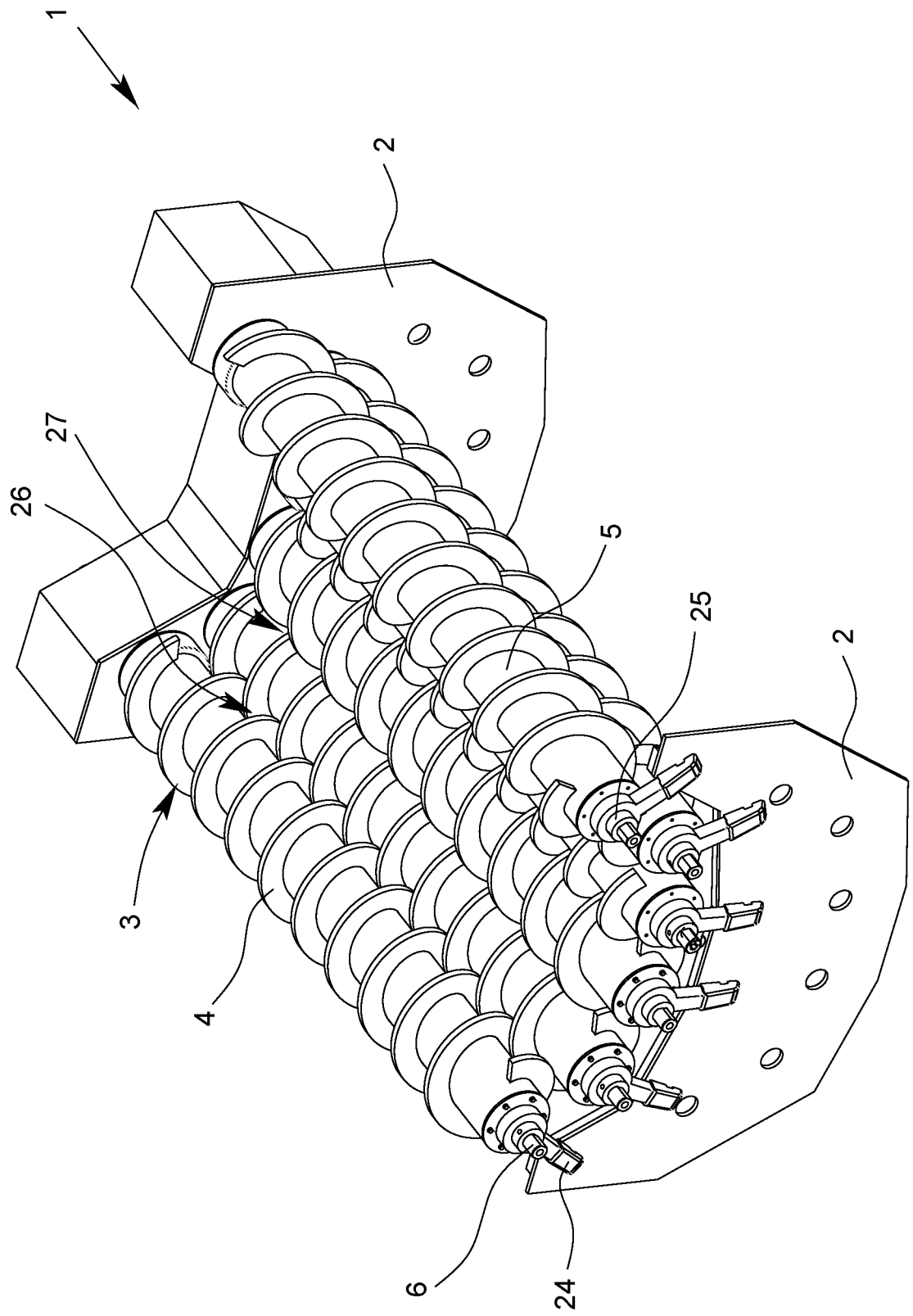
FIG. 1 shows a schematic perspective view of a classifying apparatus according to the invention.
Figure 4:
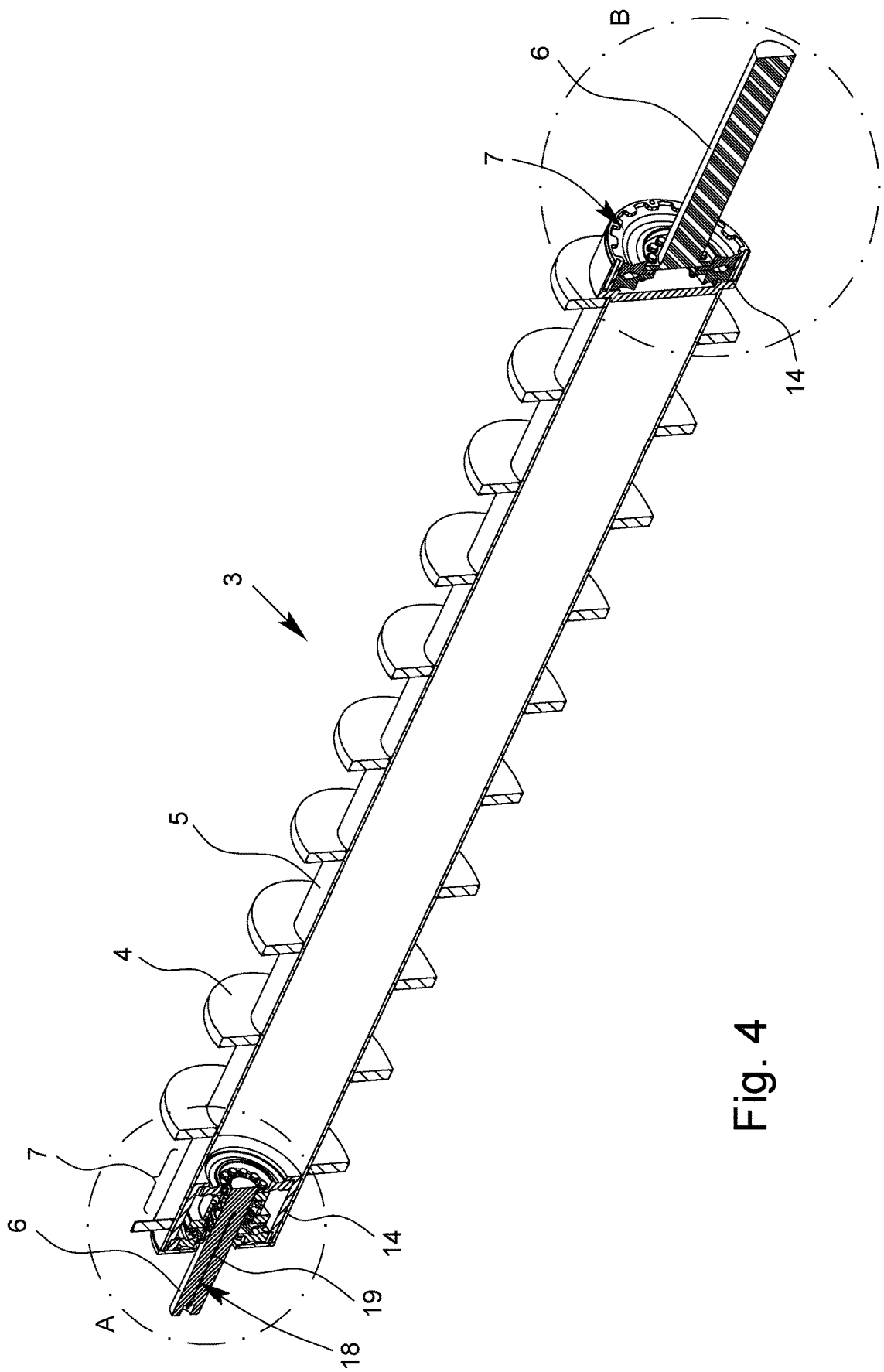
FIG. 4 shows a schematic perspective representation of the spiral shaft along section IV-IV of FIG. 3.

FIG. 1 shows an apparatus 1 for classifying material to be classified having a machine frame 2 and having at least two spiral shafts 3 mounted rotatably on the machine frame 2, wherein at least one spiral shaft 3 comprises a core tube 5 having at least one outer screw helix 4 and at least one bearing journal 6. Not shown is that the apparatus 1 preferably performs a separation into two fractions, in particular wherein the one fraction is ejected beneath the spiral shafts 3. Also not shown is that the apparatus 1 is used preferably in a quarry, in particular wherein it is provided that the material to be classified is sticky, clayey soil and fine and/or coarser rocks. The apparatus 1 according to FIG. 4 is characterized in that the core tube 5 is elastically mounted by means of at least one elastic bearing means 7. The elastic mounting is done preferably in such a way that the core tube 5 can move relative to the bearing journal 6 on account of the elasticity of the elastic bearing means 7.

FIG. 4 further shows that the elastic bearing means 7 is provided on the spiral shaft 3 at both ends. In another embodiment, not shown, it may be provided that the elastic bearing means 7 is mounted only at one end, especially the drive end or the output end. In the one-ended mounting of the elastic bearing means 7 on the spiral shaft 3, the other end of the spiral shaft 3 may likewise be supported. It is understood, of course, that it may be further provided that in the case of a one-ended elastic mounting of the spiral shaft 3 by an elastic bearing means 7, the opposite end of the spiral shaft 3 in the elastic bearing means 7 also can be unsupported and/or braced against the machine frame 2.

Furthermore, FIG. 1 shows that the spiral shaft 3 is rotatably mounted at both ends by a respective bearing journal 6. In addition, FIG. 1 makes it clear that the spiral shaft 3 is braced against the machine frame 2.

Moreover, it is not represented in the exemplary embodiments that the elastic bearing means 7 is designed such that it enables an elastic yielding movement of the core tube 5 transversely to the axis of rotation 8 (per FIG. 3) of the spiral shaft 3 by up to 3 cm.

Furthermore, FIG. 4 shows that the elastic bearing means 7 comprises at least one bearing plate 9 comprising elastic material. The bearing plate 9 is elastically operative between the core tube 5 and the bearing journal 6 of the spiral shaft 3. FIG. 4 shows that the elastic interaction between the bearing plate 9 and the core tube 5 as well as the bearing journal 6 of the spiral shaft 3 is indirect, since the core tube 5 is separated by a bearing housing 14 from the bearing plate 9. The elastic bearing means 7 per FIG. 4 is arranged at both ends of the spiral shaft 3, wherein different configurations of the elastic bearing means 7 are provided at the ends of the spiral shaft 3.

Figure 7:
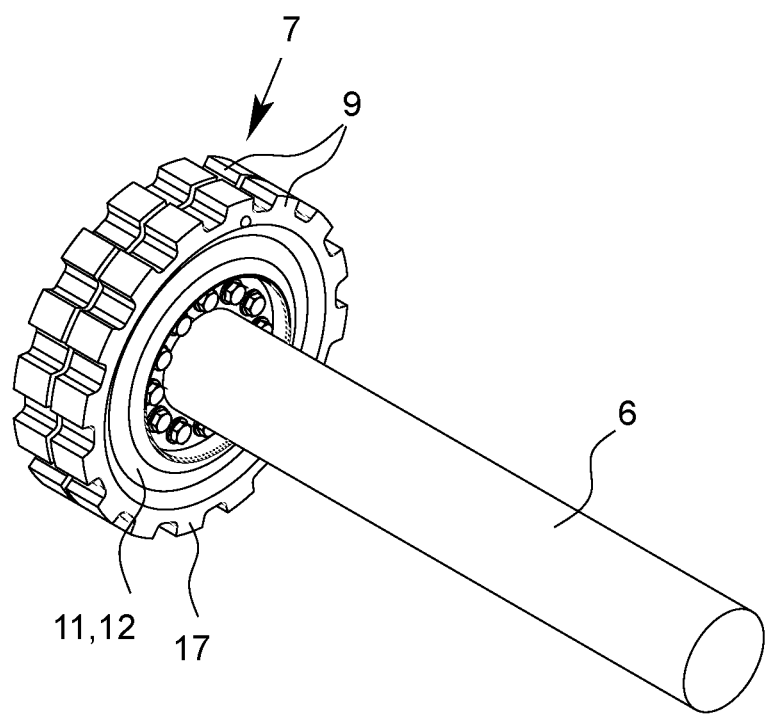
FIG. 7 shows a schematic perspective representation of the bearing means.
Figure 8:
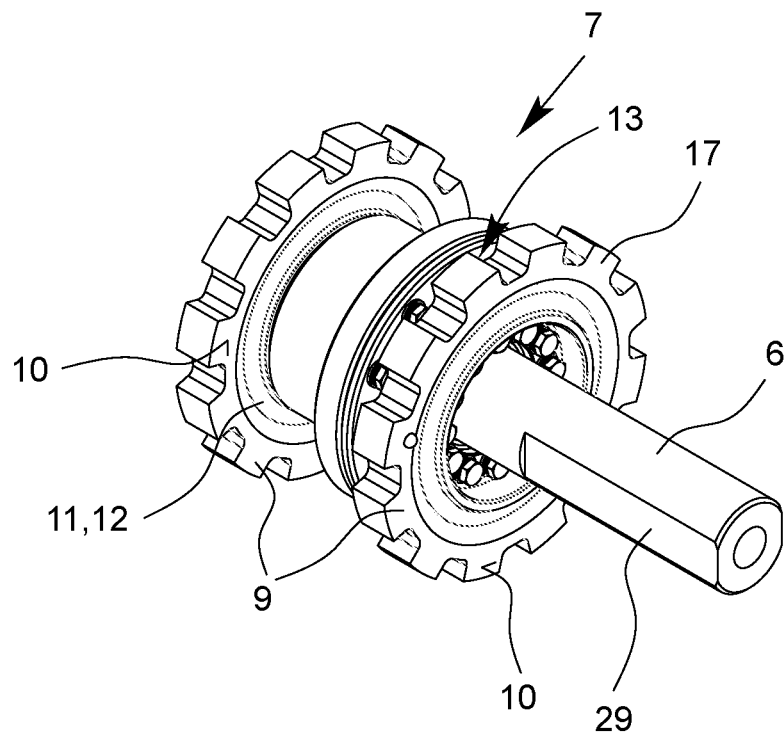
FIG. 8 shows a further schematic perspective representation of the bearing means.
Figure 9:
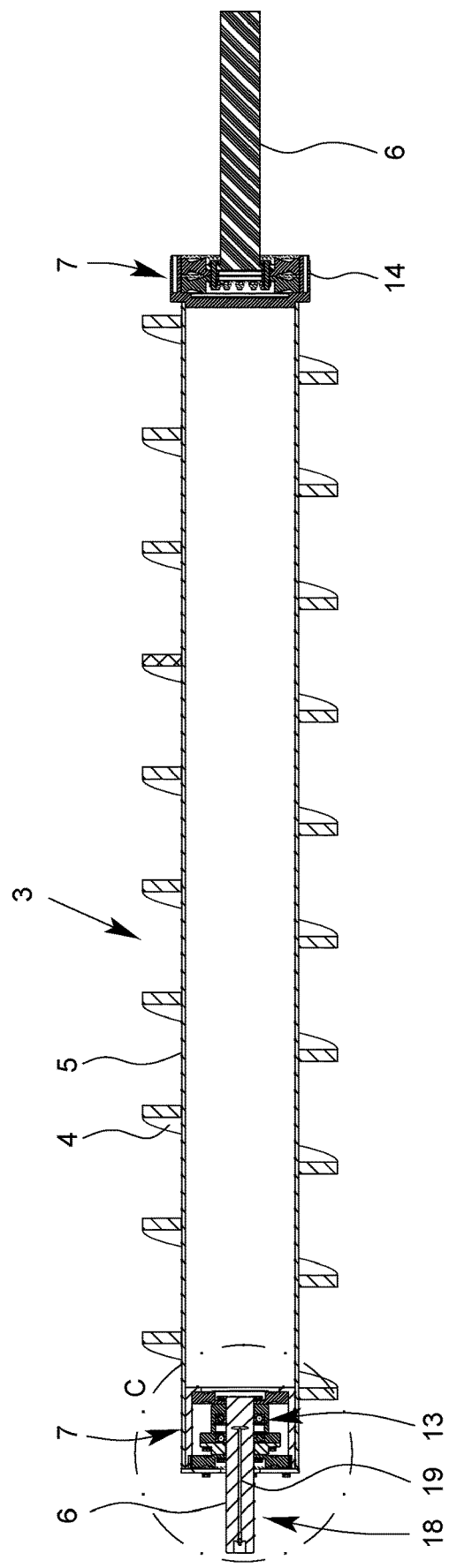
FIG. 9 shows a cross sectional view of a further embodiment of a spiral shaft according to the invention.

A detail view of the bearing plate 9 is afforded by FIG. 7 and/or FIG. 8, illustrating different embodiments of the elastic bearing means 7. FIGS. 7 and 8 show that the bearing plate 9 is configured to be at least substantially ring-shaped and hollow cylindrical.

Moreover, FIGS. 7 and 8 show that the bearing plate 9 in the region of the elastic material has an encircling material reduction 11 in the form of a recess 12 on both side surfaces 10. Per FIG. 10, the recess 12 is formed in mirror symmetry in the cross-section surface of the bearing plate 9 in the region of the recess 12. It is not shown that in further variant embodiments of the apparatus 1 only one side surface 10 of the bearing plate 9 has a material reduction 11 in the region of the elastic material, in particular wherein this reduction is at least substantially encircling and preferably having the form of a recess 12.

Figure 5:
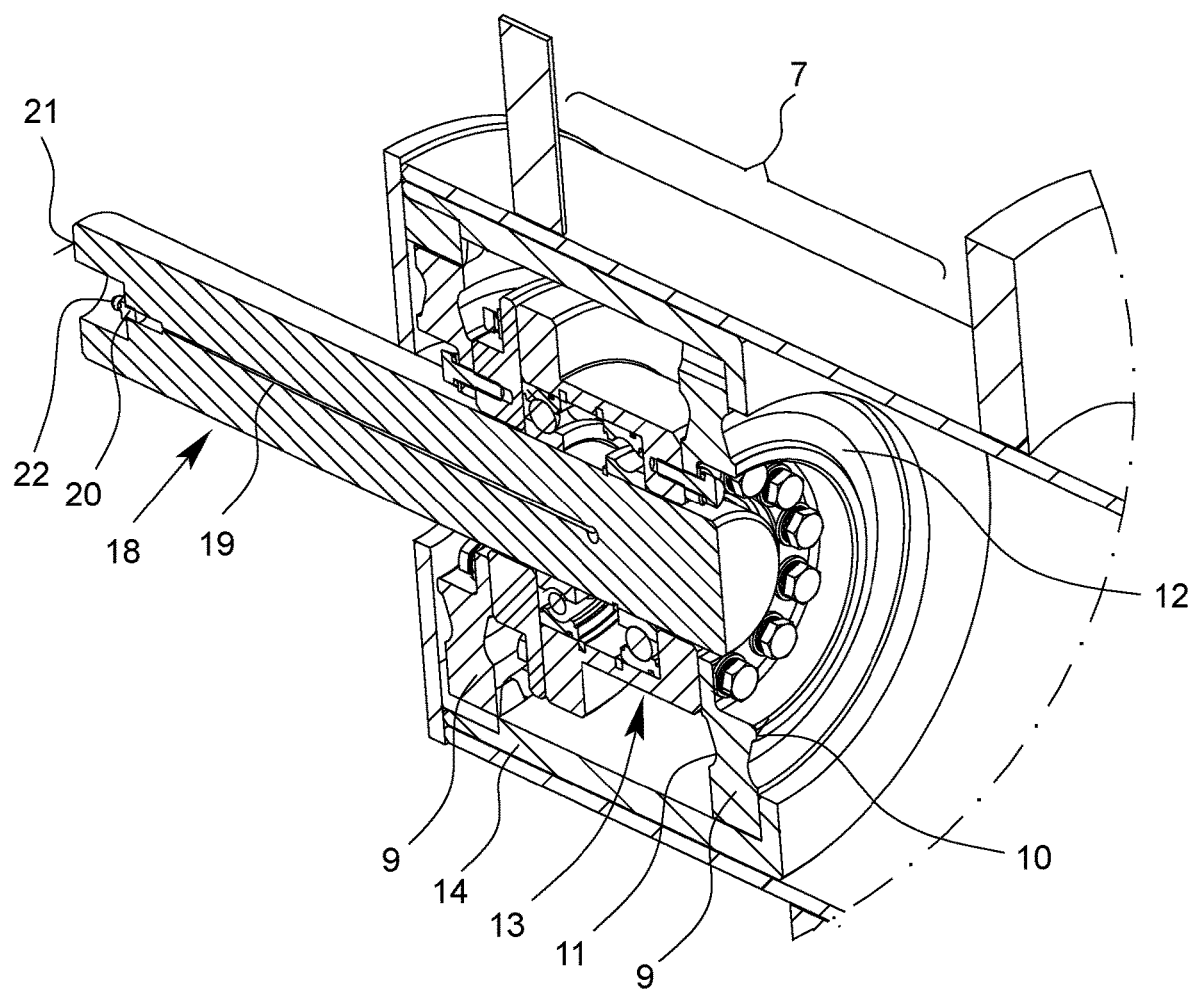
FIG. 5 shows a schematic perspective detail view A of the bearing means of FIG. 4.
Figure 6:
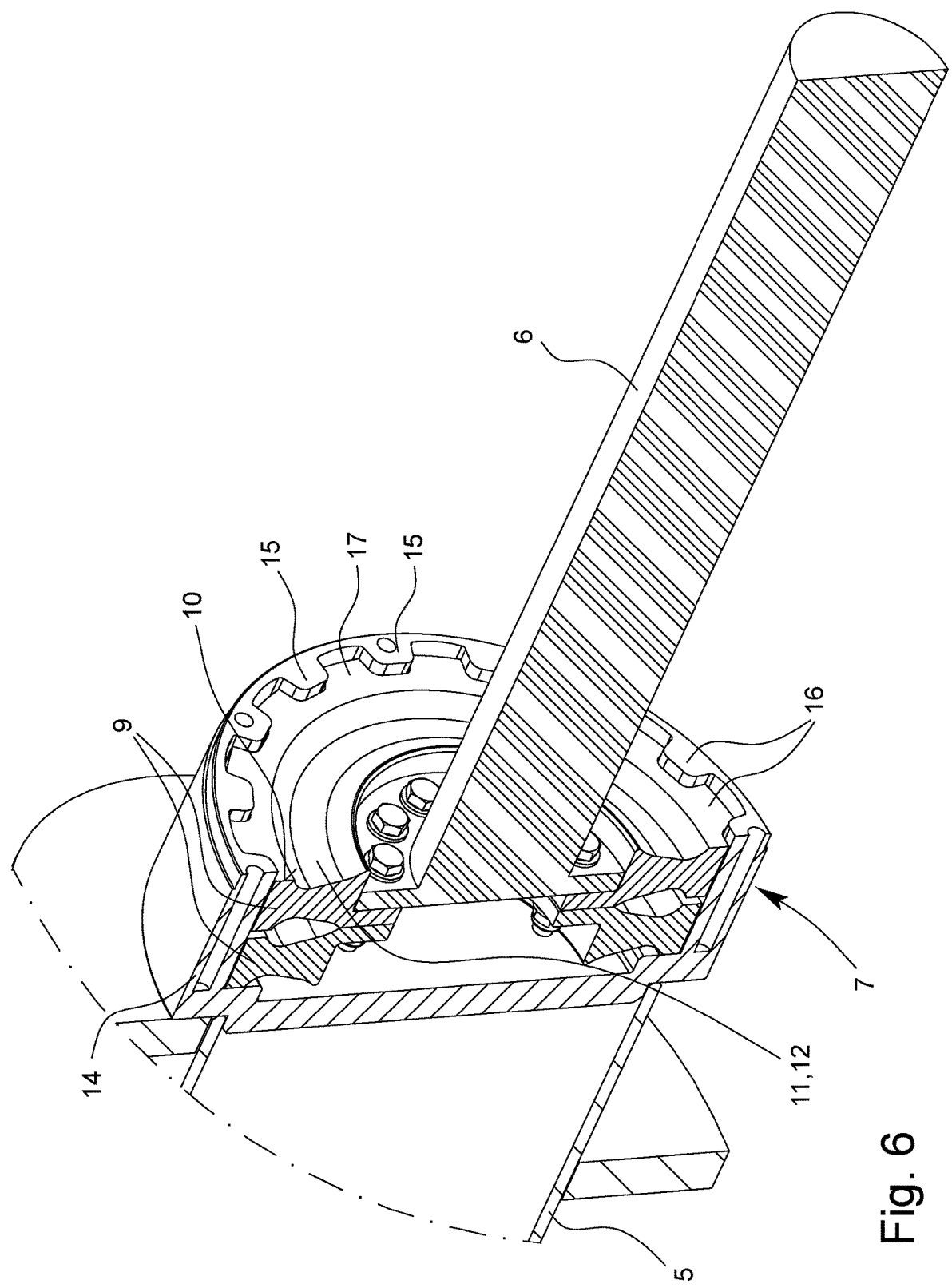
FIG. 6 shows a schematic perspective detail view B of the bearing means of FIG. 4.

Furthermore, FIGS. 4 and 6 show that the bearing journal 6 is firmly connected to at least one bearing plate 9, especially per FIG. 6 to two bearing plates 9. This firm connection of the bearing journal 6 to the bearing plate 9 and thus to the spiral shaft 3 makes it possible for the bearing journal 6 to rotate together with the spiral shaft 3. On the other hand, FIGS. 4 and 5 show that the bearing journal 6, especially at the output end, is mounted rotatably relative to the bearing plate 9. Moreover, FIG. 5 makes it clear that a roller bearing 13 is provided between the two bearing plates 9. The bearing journal 6 at the output end per FIG. 5 has a stationary configuration in the exemplary embodiment shown, so that the bearing journal 6 does not co-rotate with the spiral shaft 3.

Moreover, FIGS. 4 to 6 illustrate how the bearing plate 9 is arranged in a bearing housing 14 of the spiral shaft 3, wherein the bearing housing 14 is firmly connected to the core tube 5. Accordingly, the bearing housing 14 co-rotates together with the bearing plate 9 with the spiral shaft 3 during the rotation.

In all exemplary embodiments shown, it is provided that the bearing plate 9 is connected by positive locking to the bearing housing 14. According to the exemplary embodiments shown, the positive-locking connection of the bearing housing 14 to the bearing plate 9 is formed by a toothed coupling 16 between the bearing housing 14 and the elastic bearing means 7. Moreover, the figures illustrate how the toothed coupling 16 in the exemplary embodiments shown is formed by internal teeth 15, which the bearing housing 14 has on its inside, and by external teeth 17 of the bearing plate 9 corresponding to the internal teeth 15. FIGS. 5 and 6 show that the internal teeth 15 of the bearing housing 14 mesh with the external teeth 17 of the bearing plate 9.

Furthermore, FIGS. 7 and 8 show that the bearing plate 9 is formed with rotational symmetry in the region of the recess 12. In addition, FIGS. 7 and 8 show that the rotational symmetry of the bearing plate 9 is also present as far as the external teeth 17, but excluding the external teeth 17 of the bearing plate 9.

In the exemplary embodiments shown, the elastic bearing means 7 comprises two bearing plates 9, especially at both the drive end and the output end. However, it should be pointed out that it is also fundamentally possible to provide only one bearing plate or more than two bearing plates.

Furthermore, FIG. 5 illustrates that the roller bearing 13 is provided between the bearing plates 9. The bearing plates 9 in the exemplary embodiment shown in FIG. 5 are firmly connected to the roller bearing 13.

Figure 10:
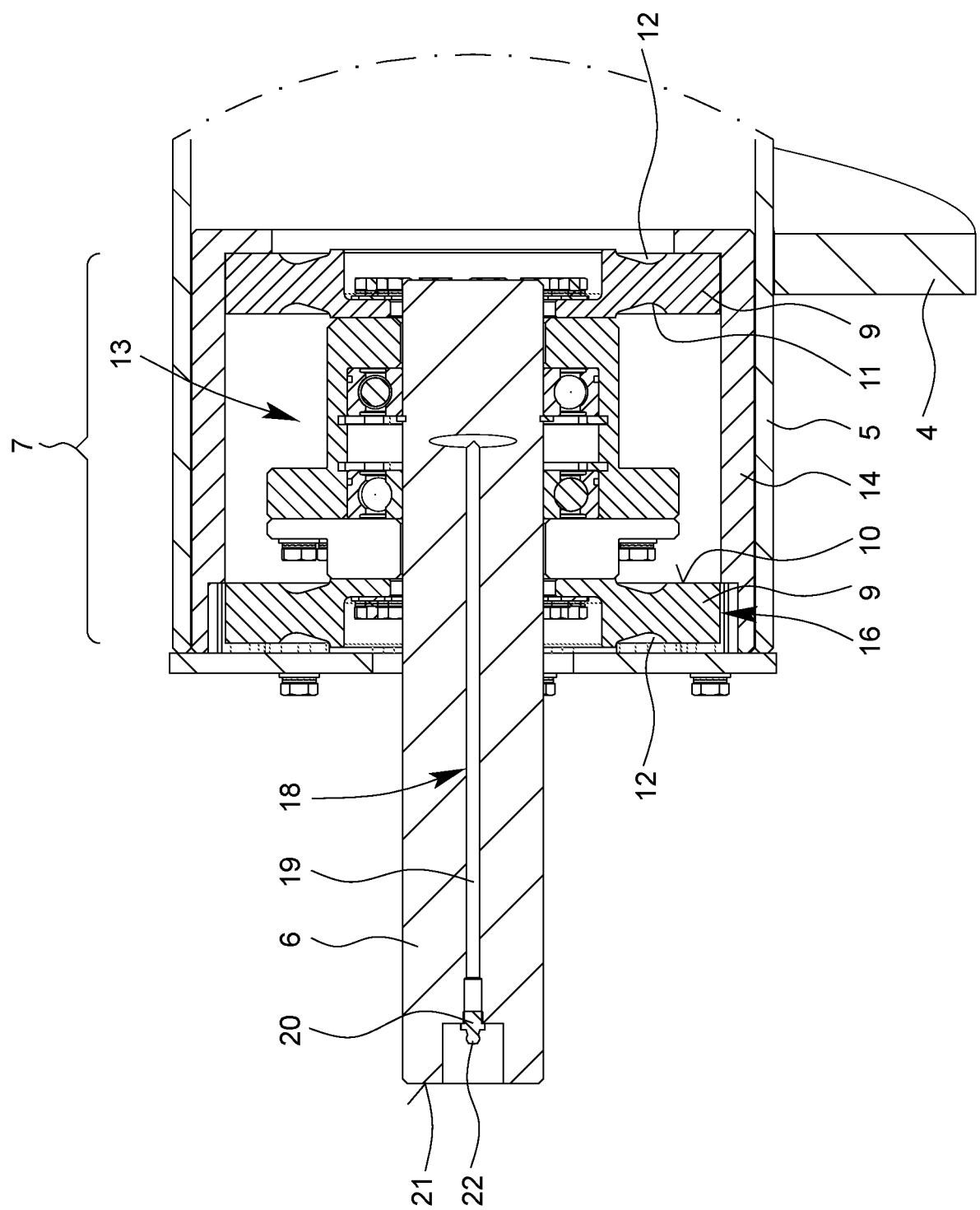
FIG. 10 shows a cross sectional view of detail C of FIG. 9.

According to FIG. 5, a lubricating device 18 is provided in the bearing journal 6, especially at the output end. This lubricating device 18 may, in one exemplary use not shown, be utilized for lubricating grease. In particular, the region of the elastic bearing means 7 at the output end is at least substantially air-tight, so that only individual droplets of lubricating grease can be placed by the lubricating device 18 in the region of the roller bearing 13. The lubricating device 18 according to FIG. 5 comprises at least one lubricating duct 19 in the bearing journal 6 with at least one lubricating nipple 20 on the outer end face 21 of the bearing journal 6. FIG. 10 shows the lubricating device 18 in a cross-sectional view, wherein it is clear from FIG. 10 that a protective cap 22 is provided on the outer end face 21 of the bearing journal 6 to cover the lubricating nipple 20. Alternatively, in an exemplary embodiment (not shown), a protective screw 23 can be used to cover the lubricating nipple 20 of the lubricating device 18.

Furthermore, FIG. 1 shows an apparatus for classifying material to be classified having a machine frame 2 and having at least two spiral shafts 3 mounted rotatably on the machine frame 2, wherein an elastic bearing means 7 is provided having at least one bearing support 24, in order to make possible an elastic yielding movement of the spiral shaft 3. According to FIG. 1, an elastic bearing means 7 is provided with at least one bearing support 24. In the exemplary embodiment shown, six bearing supports 24 are present at the output end. The apparatus 1 preferably comprises one of the previous variant embodiments. Furthermore, in one application (not shown), the apparatus 1 is used in a quarry for the classifying of soil, preferably sticky and clayey soil, and coarser and/or finer rocks.

Moreover, the bearing support 24 of FIG. 1 comprises a bearing bush 25 for the elastic mounting of the spiral shaft 3 as well as a spring means, especially one designed as a leaf spring, connected to the bearing bush 25. Thanks to this spring means, an elastic movement of the spiral shaft 3 and/or the core tube 5 is likewise possible, specifically relative to the machine frame 2. The spring means connected to the bearing bush 25 may thus be realized, alternatively or additionally to the previously described embodiment of the elastic mounting of the core tube 5 by the elastic bearing means 7.

The elastic mounting of the spiral shaft 3 by means of the elastic bearing means 7 with at least one bearing support 24 can also be designed as a joint (not shown). The joint and/or the elastic bearing means 7 make possible the resilience of the support bearing, in particular wherein it is required to assure a yielding movement (not shown) of the spiral shaft 3 transversely to its axis of rotation 8 and up to 3 cm.

It is not shown that the bearing plate 9 comprises or consists of at least one material of a form-stable and elastically deformable plastic, especially an elastomer, preferably a rubber elastomer, more preferably an acrylonitrile-butadiene rubber (NBR) and/or chloroprene rubber (CR) and/or ethylene-polypropylene-diene rubber (EPDM), and/or natural rubber (NR). The permissible compressive stress of the material of the bearing plate 9 is advantageously a permissible value of greater than 0.01 N/mm$^2$, preferably greater than 1 N/mm$^2$, more preferably between 1 and 50 N/mm$^2$, more preferably still between 1 and 20 N/mm$^2$ and especially at least substantially 15 N/mm$^2$.

Furthermore, FIG. 4 illustrates that the bearing means 7 at the output end (see detail view A) has two bearing plates 9 spaced further apart from each other than the bearing means 7 at the drive end (see detail view B). The greater spacing of the bearing plates 9 of the elastic bearing means 7 at the output end results in particular from providing a roller bearing 13 between the bearing plates 9 for the rotatable mounting of the spiral shaft 3 and/or the core tube 5.

Furthermore, it is not shown in the exemplary embodiments that a bearing support 24, especially a rigid one, can be elastically mounted with a machine element, especially at the lower end and/or at the foot of the bearing support 24. Preferably, the machine element is designed as an elastomer bearing block. Furthermore, the machine element preferably comprises a form-stable and elastically deformable plastic as its material, especially an elastomer, preferably a rubber elastomer, more preferably an acrylonitrile-butadiene rubber (NBR) and/or chloroprene rubber (CR) and/or ethylene-polypropylenediene rubber (EPDM), and/or natural rubber (NR). In particular, the material of the machine element may comprise the same material as the bearing plate 9 of the elastic bearing means 7, especially the means at the drive end.

Moreover, in an exemplary application (not shown) of the apparatus 1, it is provided that the material to be classified has a dwell time of over 1 s, preferably over 3 s, more preferably between 4 and 20 s and especially at least substantially between 5 and 15 s. This dwell time in the range of seconds makes possible a clean classification of the material to be classified.

Figure 2:
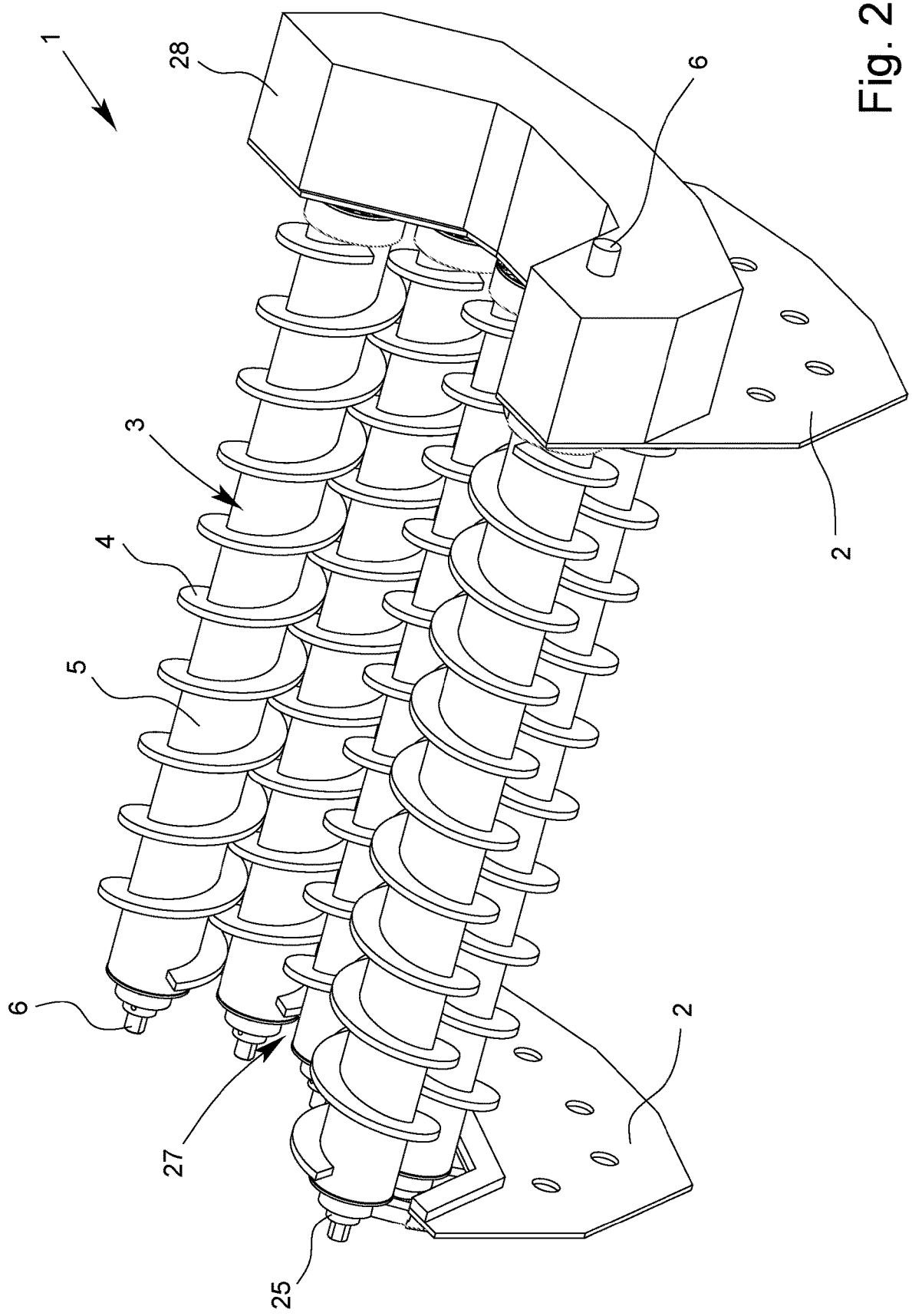
FIG. 2 shows a further schematic perspective view of a classifying apparatus according to the invention.

It is clear with reference to FIG. 2 that the apparatus 1 comprises a plurality of spiral shafts 3. The spiral shafts 3 mesh with each other per FIG. 2, with the clear space between two adjacent spiral shafts 3 characterized by the core tubes 5 and the outer screw helices 4.

Furthermore, it is provided per FIG. 2 that the bearing journal 6 at the drive end is covered by a housing of the drive 28, except for a bearing journal 6. A bearing journal 6 of a spiral shaft 3 protrudes out from the housing of the drive 28, in particular wherein this bearing journal 6 is provided for mounting on a motor. It is not shown that the spiral shafts 3 are joined together inside the housing of the drive 28, so that by driving one spiral shaft 3 by means of a motor all further spiral shafts 3 of the apparatus 1 are driven.

It is provided that the spiral shafts 3 are rotated about their longitudinal axis and/or turning axis 8, in particular their axis of rotation. This rotation may be produced in particular by a motor (not shown). In another embodiment variant (not shown), it may be provided that a plurality of motors and/or drives are used, especially with a synchronization of the angles of rotation.

Further, it is not shown that at least two adjacent spiral shafts 3 have the same direction of rotation and that the axes of rotation 8 of at least three spiral shafts 3 are not arranged in a common plane.

The spiral shafts 3 according to FIGS. 1 and 2 are braced at least at one end on the machine frame 2.

Moreover, FIG. 1 shows that a classifying surface 26 formed by the spiral shafts 3 is curved in at least one partial region. In addition, the classifying surface 26 is curved in one partial region and flat in another partial region. The curvature of the classifying surface 26 is such that a trough 27 is formed. In an exemplary embodiment (not shown), the classifying surface 26 may also be part of a trough 27.

According to FIGS. 1 and 2, it is provided that the spiral shafts 3 have different core tubes 5 in the apparatus 1. The core tubes 5 in the middle of the classifying surface 26 are provided with a larger diameter. In addition, the core tubes 5 in the middle of the classifying surface 26, especially in the region of the lowest point of the trough 27, may have a greater wall thickness.

Furthermore, it is not shown that the spiral shafts 3 can be driven with the same velocity and different directions of rotation.

Figure 3:
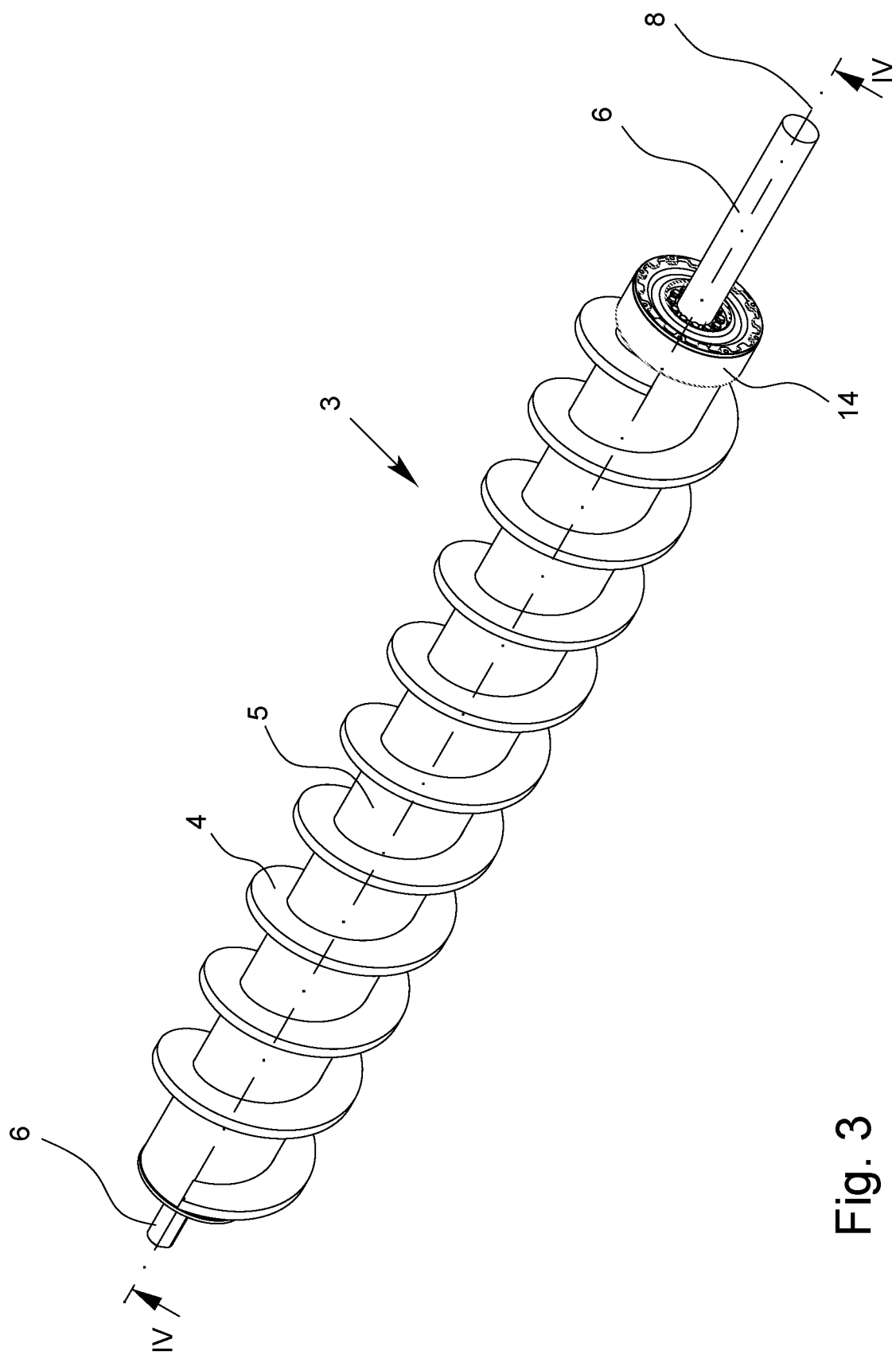
FIG. 3 shows a schematic perspective view of a spiral shaft according to the invention.
Figure 11:
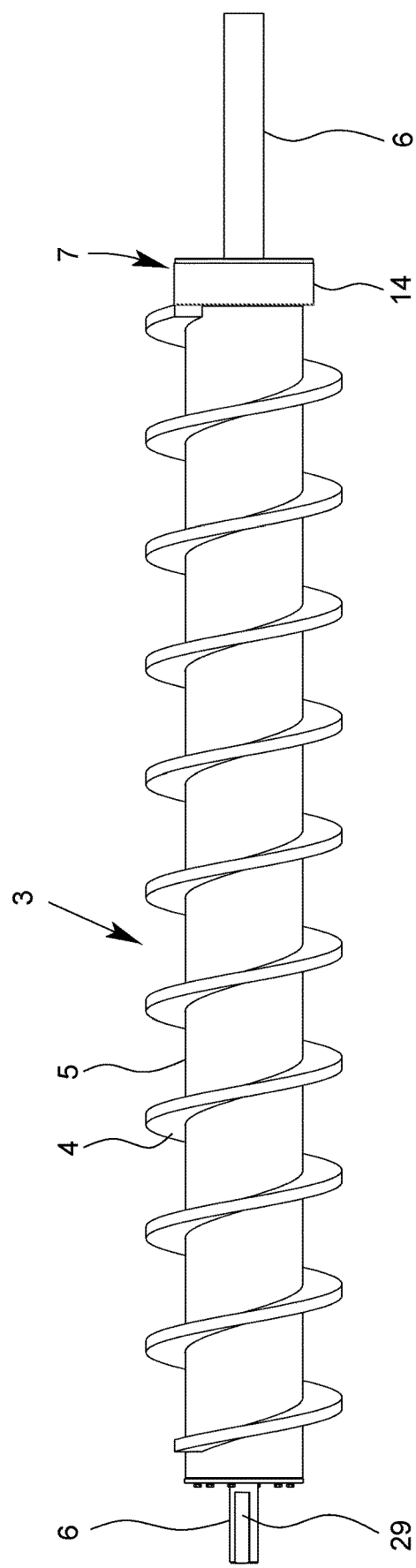
FIG. 11 shows a schematic perspective view of a further embodiment of a spiral shaft according to the invention.
Figure 12:
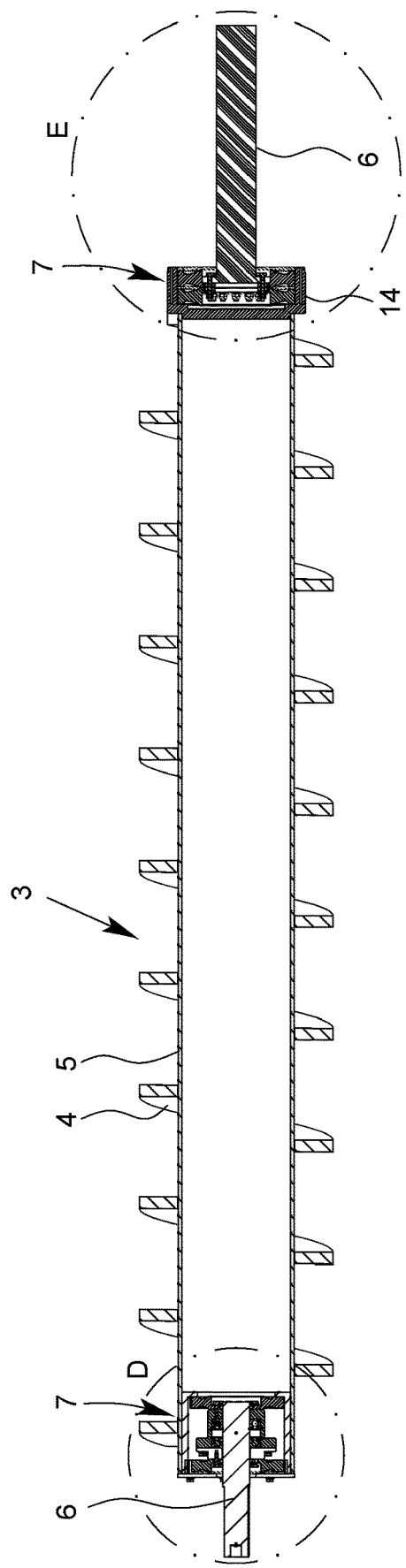
FIG. 12 shows a cross sectional view of a spiral shaft according to the invention per FIG. 11.
Figure 13:
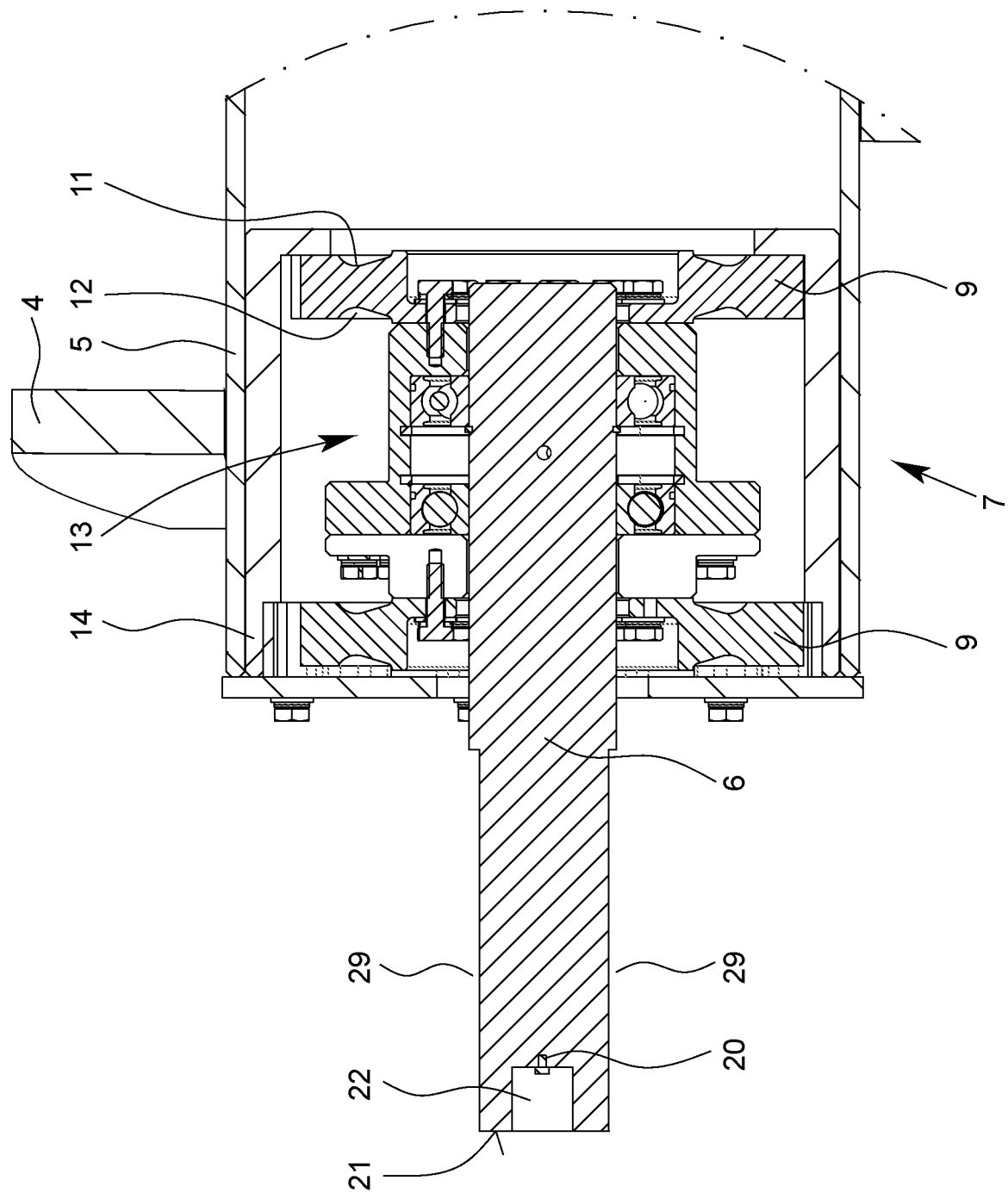
FIG. 13 shows a cross sectional view of detail D of FIG. 12 of a spiral shaft according to the invention.

FIG. 11 shows another embodiment of the spiral shaft 3 and/or a front view of the spiral shaft 3 of FIG. 3. FIG. 12 represents a cross-sectional view of the spiral shaft 3 of FIG. 11. FIGS. 13 and 14 clarify the detail views D and E of FIG. 12. FIG. 13 shows, in contrast to FIG. 5, that at least one recess 29 in the form of a flattening is provided on the bearing journal 6 of the output end, wherein this recess 29 serves for mounting in the bearing bush 25.

LIST OF REFERENCE NUMBERS

1 Apparatus for classifying
2 Machine frame
3 Spiral shaft
4 Outer screw helix
5 Core tube
6 Bearing journal
7 Elastic bearing means
8 Axis of rotation
9 Bearing plate
10 Side surface of bearing plate
11 Material reduction
12 Recess
13 Roller bearing
14 Bearing housing
15 Internal teeth
16 Toothed coupling
17 External teeth
18 Lubricating device
19 Lubricating duct
20 Lubricating nipple
21 Outer end face of the bearing plate
22 Protective cap
23 Protective screw
24 Bearing support
25 Bearing bush
26 Classifying surface
27 Trough
28 Drive housing
29 Recess

The invention claimed is:

1. An apparatus configured to classify material to be classified, comprising:
a machine frame and having at least two spiral shafts rotatably mounted on the machine frame, wherein at least one spiral shaft of the at least two spiral shafts comprises a core tube having at least one outer screw helix and at least one bearing journal,
wherein
the core tube is mounted elastically relative to the bearing journal by at least one elastic bearing, the core tube being fixed on an inner side to a bearing housing, and the at least one elastic bearing being located between the bearing housing and the bearing journal, wherein the elastic bearing comprises at least one bearing plate having an elastic material, configured substantially as a ring and/or a hollow cylinder, and the at least one bearing plate is elastically operative between the core tube and the bearing journal of the spiral shaft.

2. The apparatus according to claim 1, wherein the spiral shaft is rotatably mounted on both sides by a respective bearing journal.

3. The apparatus according to claim 1, wherein the elastic bearing allows an elastic yielding movement of the core tube transversely to the axis of rotation of the spiral shaft by up to 3 cm.

4. The apparatus according to claim 1, wherein the material is a soil.

5. The apparatus according to claim 1, wherein the at least one bearing plate comprises a material reduction on at least one side surface in the area of the elastic material wherein a cross sectional area of the bearing plate is formed in mirror symmetry in the area of the material reduction.

6. The apparatus according to claim 1, wherein the bearing journal is connected to the at least one bearing plate or the bearing journal is rotatably mounted relative to the bearing plate by a roller bearing.

7. The apparatus according to claim 1, wherein the at least one bearing plate is arranged in a bearing housing of the spiral shaft and is joined by positive locking to the bearing housing and the bearing housing is joined to the core tube.

8. The apparatus according to claim 7, wherein the bearing housing has internal teeth on the inside and/or a toothed coupling is provided between the bearing housing and the elastic bearing and/or the at least one bearing plate has external teeth corresponding to the internal teeth of the bearing housing, wherein the internal teeth of the bearing housing engage with the external teeth of the at least one bearing plate.

9. The apparatus according to claim 6, wherein the elastic bearing comprises two bearing plates and the roller bearing is provided between the bearing plates, wherein the bearing plates are joined to the roller bearing.

10. The apparatus according to claim 1, wherein a lubricating device is provided at the output end in the area of the elastic bearing for lubricating grease, and wherein at least one lubricating duct is provided in the bearing journal having at least one lubricating nipple on the external end face of the bearing journal, wherein the lubricating nipple is associated with a protective cap and/or protective screw.

11. The apparatus according to claim 1, wherein the spiral shafts comprise different core tubes, wherein the core tubes have varying diameters and/or a varying wall thicknesses.

12. An apparatus to classify material comprising:
a machine frame; and
at least two spiral shafts rotatably mounted on the machine frame,
wherein
at least one elastic bearing is provided at an output end of at least one of the at least two spiral shafts, the at least one elastic bearing having at least one bearing support, to enable an elastic yielding movement of the spiral shaft, wherein the bearing support comprises a bearing bush and a spring connected to the bearing bush, wherein the spring is a leaf spring.

13. A soil classification machine for a quarry comprising:
a machine frame, the machine frame having at least two spiral shafts rotatably mounted on the machine frame, the at least two spiral shafts elastically movable relative to one another, at least one spiral shaft of the at least two spiral shafts comprises a core tube having at least one outer screw helix and at least one bearing journal,
wherein the core tube is mounted elastically relative to the bearing journal by at least one elastic bearing located between the core tube and the bearing journal, and the elastic bearing comprises at least one bearing plate having an elastic material, the elastic material being substantially ring-shaped and/or a hollow cylinder, and the at least one bearing plate being elastically operative between the core tube and the bearing journal of the spiral shaft.

14. The machine according to claim 13, wherein the at least one spiral shaft is rotatably mounted on both sides by a respective bearing journal.

15. The machine according to claim 13, wherein the elastic bearing allows an elastic yielding movement of the core tube transversely to the axis of rotation of the spiral shaft by up to 3 cm.

16. The machines according to claim 13, wherein the at least one bearing plate comprises a material reduction area on at least one side surface in the area of the elastic material and wherein a cross sectional area of the bearing plate is formed in mirror symmetry in the area of the material reduction.

17. The machine according to claim 13, wherein the bearing journal is connected to the at least one bearing plate or the bearing journal is rotatably mounted relative to the bearing plate by a roller bearing.

18. The machine according to claim 13, wherein:
the at least one bearing plate is arranged in a bearing housing of the spiral shaft and is joined by positive locking to the bearing housing, and the bearing housing is joined to the core tube.

19. The mac ne according to claim 13, wherein the spiral shafts comprise different size core tubes and/or the core tubes have differing wall thicknesses.

* * * * *